(12) United States Patent
Hopper

(10) Patent No.: US 6,750,845 B2
(45) Date of Patent: Jun. 15, 2004

(54) COMPUTER POINTING DEVICE

(76) Inventor: Gregory S. Hopper, 9650 Strickland Rd. Suite 103-256, Raleigh, NC (US) 27615

(*) Notice: Subject to any disclaimer, the term of this patent is extended or adjusted under 35 U.S.C. 154(b) by 203 days.

(21) Appl. No.: 09/999,666

(22) Filed: Oct. 19, 2001

(65) Prior Publication Data

US 2003/0076290 A1 Apr. 24, 2003

(51) Int. Cl.[7] ............................ G09G 5/00; G09G 5/08
(52) U.S. Cl. ................... 345/156; 345/161; 345/163
(58) Field of Search .......................... 345/156, 157, 345/158, 159, 160, 161, 163, 167, 168

(56) References Cited

U.S. PATENT DOCUMENTS 5,541,622 A * 7/1996 Engle et al. ............... 345/161
6,031,518 A * 2/2000 Adams et al. ............. 345/156

* cited by examiner

Primary Examiner—Vijay Shankar
(74) Attorney, Agent, or Firm—Glasgow Law Firm, PLLC

(57) ABSTRACT

A computer pointing device including a core electronic translator module and a housing, the core electronic translator module being axis-deflection-based and the housing including at least one input switch, at least one data transmission connection, a base, and a core electronic translator module axis extension, wherein the tracking movement of the device is effected by whole hand movement. The extension is designed to provide increased input sensitivity and low relief and includes a customizable and replaceable message space. The base includes thumb-activated selector switches to reduce the use of digital flexor muscles. The base also includes data transmission connections such that the device can be connected to a multiplicity of devices simultaneously.

39 Claims, 7 Drawing Sheets

RIGHT

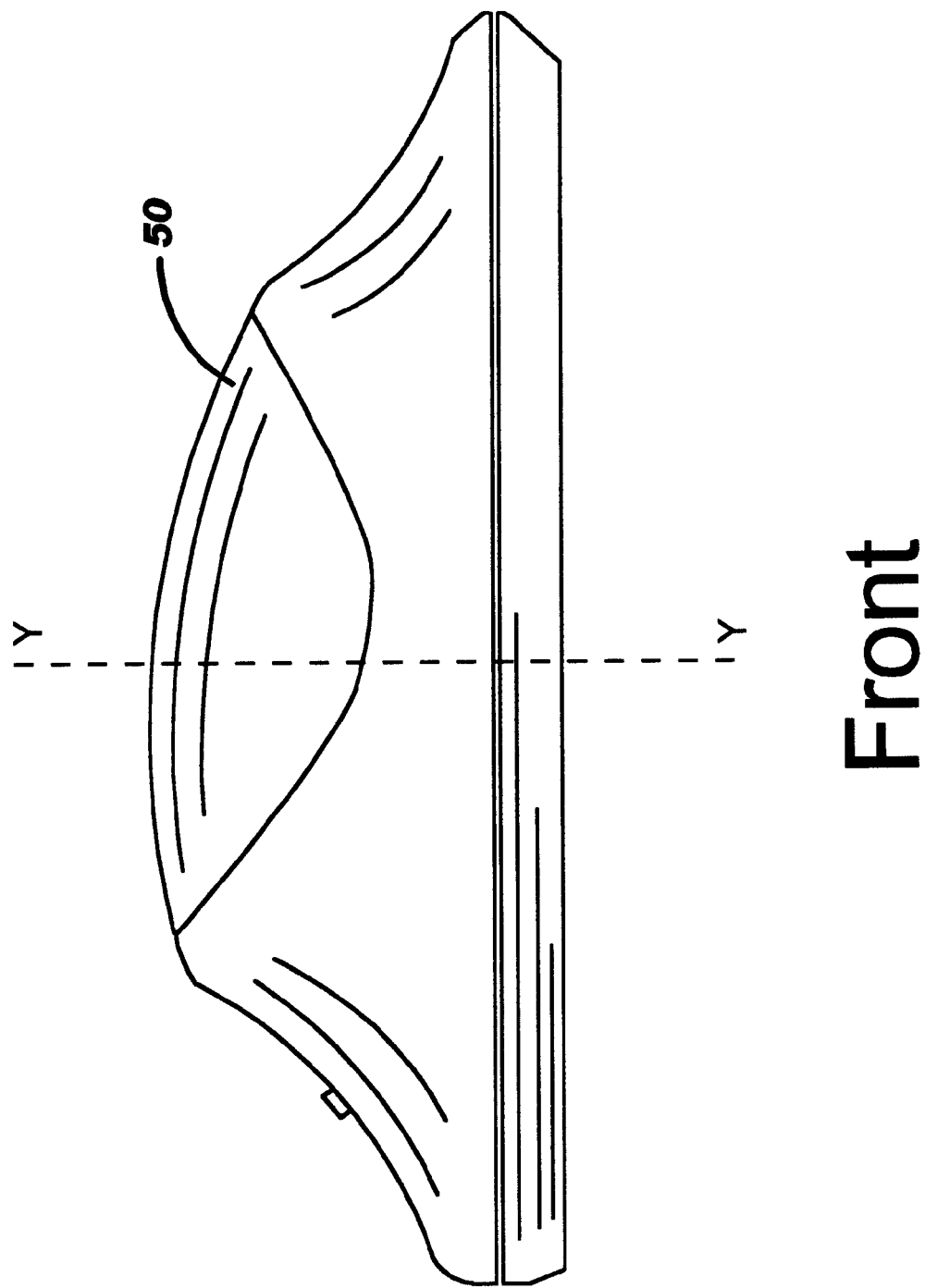

COMPUTER POINTING DEVICE

BACKGROUND OF THE INVENTION (1) Field of the Invention

The present invention relates generally to computer pointing devices and, more particularly, to a computer pointing device with an anti-jarring design, enhanced usability, and functionality.

(2) Description of the Prior Art

Pointing devices for computers generally fall into one of four categories: cursor movement is caused by translation of a device over a surface, such as with mechanical and optical mice, "pen mice", and similar devices; cursor movement is caused by translation of a finger or other stylus-like object over the surface of the device, such as with trackpads, touchscreens, digitizing tablets/pucks, light pens, and similar devices; cursor movement is caused by manipulation of a small stationary object by a single digit like a finger or thumb, such as with pointing sticks, thumbpads, and similar devices; and cursor movement is caused by manipulation of a moveable component within a stationary housing (e.g., joysticks, trackballs, and similar devices.)

A variety of shortcomings are associated with these prior art inventions. "Clutching" is an interaction property inherent in tablets, mice, and other devices using relative positioning. Clutching is the process of disengaging, adjusting, and re-engaging the input device to extend its field of control. This is necessary when the tracking symbol, whether a cursor on a planar CRT or a virtual hand in 3-space, cannot move because the controlling device has reached a limit in its physical space. The most obvious example is lifting and repositioning a mouse when it reaches the edge of the mouse-pad; however, many input devices for virtual environments require constant clutching and/or repetitive motion of the digital flexors to allow the user to attain new vantages in a potentially huge task space.

Jarring of the cursor when selecting is a problem inherent in pointing devices in which a selector button cannot be easily activated without affecting a change in cursor position from jarring of the cursor translator during activation of the switch. This is due to the fact that the position selector switches and cursor translator mechanism are not completely independent of one another, and persons with reduced dexterity cannot activate a selector switch without accidentally moving the cursor translator.

Reduced sensitivity of moment arm devices can be disadvantageous to persons lacking sufficient strength and dexterity to use a small moment arm device. The low profile prevents accidental touching of the pointing stick but reduces the sensitivity of the moment arm. In contrast, large pointing devices, such as joysticks, have sufficient sensitivity to be used by persons lacking strength and dexterity, but have a large profile and are easily bumped by the user.

Prior art pointing device use either large displacements of the arm or repetitive use of the digital flexors to effect cursor movement. Selection is also performed with movements of the digital flexors. These large and/or repetitive displacements are performed with the muscles of the fingers, wrist, upper arm and shoulder, and thus often lead to repetitive stress injuries of these muscles and arm regions, especially the carpal tunnel region and shoulder region.

Selection is often performed by rapidly double clicking the selector switch. This quality can be disadvantageous for persons with special needs, such as the elderly, who cannot double-click with sufficient rapidity to cause selection.

The number of selector buttons is often limited by the design of the pointing device. Multiple selector buttons are desirable to allow the user to quickly perform other repetitive functions with the pointing device. Thus, a limited number of selector buttons prevents time-saving shortcut commands to be incorporated into the pointing device.

Surface-tracking devices need to contact a surface for operation, and therefore are limited to use in environments with sufficient free surface area.

Devices in which the translator mechanism is open to the environment can accrete debris around the translator mechanism and foul. Capacitive-type devices that use finger translation to effect dielectric constant changes are sensitive to humidity, and as such cannot be used in damp environments.

Devices with removable balls are frequently disassembled by children and the ball used as a projectile by the child. For this reason, many schools require that the ball be permanently retained in the device, thus eliminating the potential danger, but simultaneous preventing cleaning of the internal components of the device.

Thus, there remains a need for a computer pointing device that is anti-jarring with reduced finger, wrist, arm, and shoulder movement, and improved sensitivity.

SUMMARY OF THE INVENTION

The present invention is directed to an electronic tracking and selecting device having an anti-jarring design including a core electronic translator module and a housing designed such that the tracking movement of the device is effected by small whole hand movements.

Accordingly, one aspect of the present invention is to provide a computer pointing device for electronic tracking and selecting that has an anti-jarring design that includes a core electronic translator module and a housing designed such that the tracking movement of the device is effected by a user's whole hand movements.

Another aspect of the present invention is to provide a computer pointing device and method of using the same for electronically tracking and selecting, wherein the tracking movement of the device is effected by a user's whole hand movements and the selection is predominantly effected by the user's thumb oppositional movement and/or substantially no digital flexure movements.

These and other aspects of the present invention will become apparent to those skilled in the art after a reading of the following description of the preferred embodiment when considered with the drawings.

BRIEF DESCRIPTION OF THE DRAWINGS

FIG. 7 is a front side view of FIG. 3.

DETAILED DESCRIPTION OF THE PREFERRED EMBODIMENTS

Figure 1:
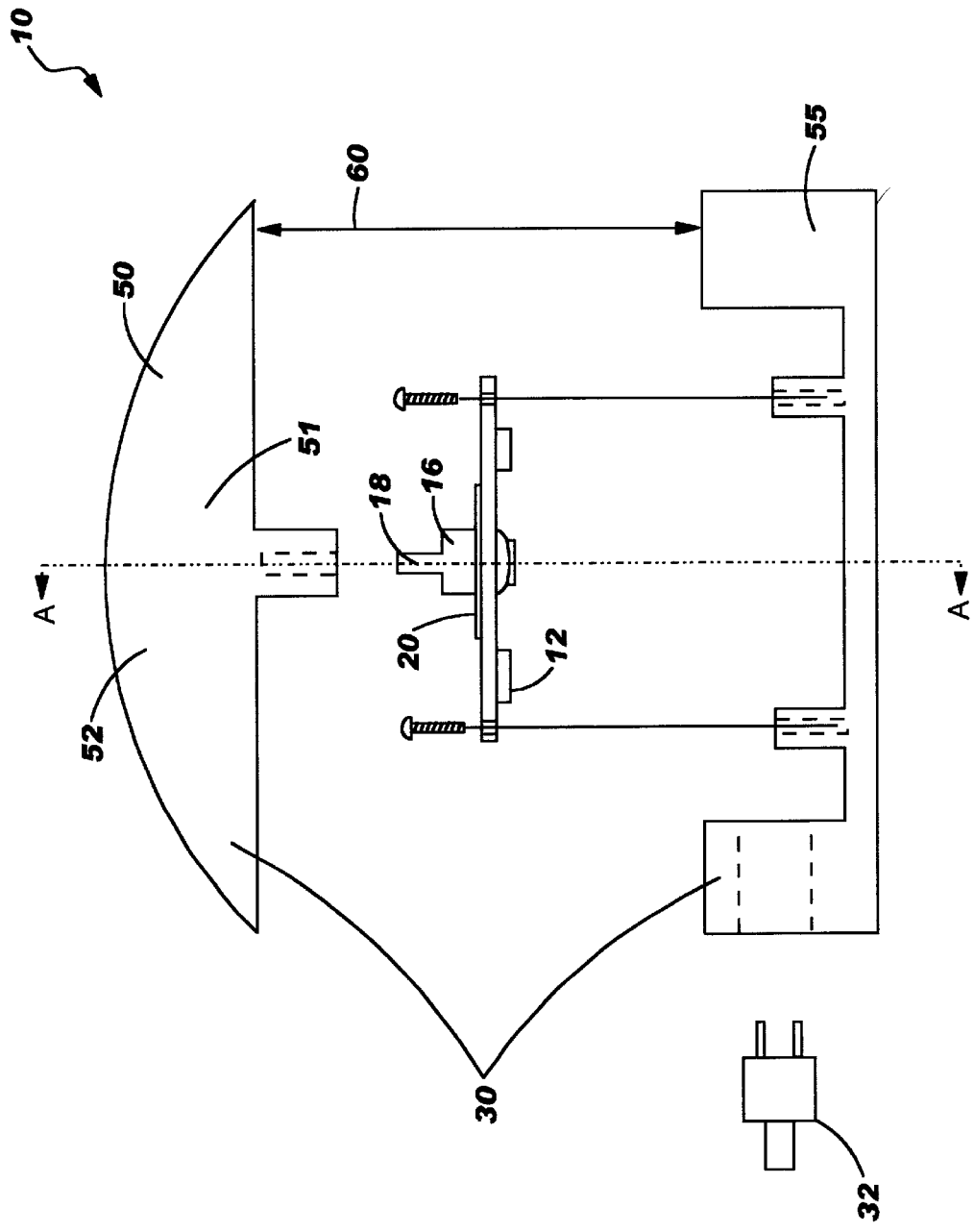
FIG. 1 is a cross-sectional exploded view of a computer pointing device constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. As best seen in FIG. 1, a computer pointing device, generally referenced as 10, for electronic tracking and selecting, and which has an anti-jarring design, includes a core electronic translator module 20 and a housing 30 having a core electronic translator module extension or pad 50, a base 55, and a core electronic translator module extension/base gap or pad/base gap 60 separating the core electronic translator module extension or pad above the base, to which it is removably connected.

The core electronic translator module uses axis-deflection-based technology to translate axis deflection into cursor movement. This technology may be provided by variable resistors 12 attached to one terminus of an axis 18 to form a pointing stick or moment arm module 16. The variable resistors can be provided by a piezoelectric module, a resistor array, a flex sensor, or an actuator disc. Because the deflection range of the stick is limited, the pointing stick module uses force-to-velocity mapping or time-to-motion translation, versus other types of pointers, which use position-to-position mapping. The pointing stick module converts deflection of the moment arm into movement of the cursor using the force applied to the moment arm. This force can be calculated, as it is proportional to the change in resistance in the variable resistors 12. The force applied to the stick can be thus calculated based on the resistance in the variable resistors. The pointing stick generates a time constant, which is equal to the time of the deflection multiplied by the force exerted. The time constant (time× force) is translated into motion or displacement on the screen.

The changes in resistance may be detected by using the clocked signal on the PS/2 mouse port and measuring the time constant of an R-C circuit using a fixed capacitor and the variable resistor in the actuator mechanism. Additional circuitry would convert the time constant to speed and direction of motion of the cursor on-screen. This circuitry could modify the acceleration and other characteristics of the cursor ballistics to provide a satisfactory user experience for a wide range of users. Alternative embodiments, for example, ones in which the clock and/or cursor movement algorithms and associated circuits are incorporated in the pointing device, are also possible, and are not outside the scope of the present invention.

The housing 30 includes a base 55 and a core electronic translation module extension or pad 50, which is removably connected to the base and to which the user's whole hand movement is applied to effect the computer pointing device electronic tracking. The base further includes the core electronic translator module, input button(s) 32, and data transmission connections. The base may be designed to rest on a flat surface, although because tracking is not effected by moving the base across a surface as with prior art designs, it can be fixed to flat or non-flat surfaces or incorporated into another device, such as the keyboard, monitor, computer housing, desk top, server rack, and the like. Also, the base can be affixed to an adjustable support, such that the user can alter the orientation of the device in space.

The moment arm extension or axis extension of the core electronic translator module axis 50 forms the terminus 51 of the moment arm. In a preferred embodiment according to the present invention, the terminus 51 is capable of being deflected from the axis 18 when whole hand movement is applied to the device. Furthermore, the terminus may be advantageously configured to form a shape that is configured to engage the palm surface of a hand. In one embodiment, this terminus is a hemispherical pad 52, preferably of lower relief than a hemisphere defined by a circular arc of constant radius. The relief can vary depending on the preference or hand anatomy of the user. For example, some persons' hand may cup excessively when placed on in a palm-down relaxed position on a surface. These persons may desire a pad with more relief, to more closely match the shape of their relaxed palm.

The moment arm extension makes the moment arm thus formed equivalent to a much longer moment arm but of low relief. This configuration provides increased sensitivity with a lower profile. The increased sensitivity can be advantageous to persons lacking sufficient strength and dexterity to use a traditional pointing stick mouse. The lower profile helps prevents accidental touching of the pointing stick and consequent movement of the cursor. Also, the terminus shape supports activation of the device by a user's whole hand.

The pad may contain a message space or area, such that a message or decorative element can be displayed on its top surface or incorporated into it. Alternatively or additionally, the pad can be translucent or transparent such that a message and/or decorative element can be incorporated into it or seen through it. For example, the pad can be customized to include safety messages, advertising messages, identification messages, and the like. Preferably, the pads are easily removable such that they can be interchanged, customized, or otherwise altered to the user's requirements or preferences. The pads can also be made from different materials, to impart different tactile and/or physical characteristics. For example, rubber can be used to provide a high-grip surface under wet or otherwise slippery conditions. The housing can also incorporate translucent materials that allow the user to see the interior or portions of the interior of the device. Additionally, a light source (not shown), such as an LED, can be incorporated into the interior of a device thus made to allow the user to more easily locate the device under poor lighting conditions or for further enhancing the attractiveness of the design to encourage use by a user, particularly for children.

The pad and the base are designed such that they prevent over-deflection of the moment arm. This is done through the appropriate sizing of the pad/base gap 60, as the pad/base gap is the movement delimiter of the moment arm. This gap can be computed via the equation:

$$h = r \tan(\theta)$$

where h is the maximum width of the pad/base gap, r is the radius of the pad, and θ is the maximum deflection angle of the moment arm. A pad/base gap thus designed limits stick deflection to within the desired parameter and makes the device self-protecting. The angle θ is typically provided by the manufacturer of the core electronic module as the maximum angle deflection specification. However, the gap should allow as much deflection of the pad as is necessary for the user to perceive movement of the pad. If the user does not perceive physical movement of the pad, then he/she may tend to over-deflect the pad. A range of motion through a solid cone of approximately 3–10 degrees is sufficient in the majority of cases to allow proper perception and control.

A resistive element may be incorporated into the core electronic module or into housing, such that the user will experience increased resistance with increased deflection of the moment arm. A resisting or restoring force is important to give the user the sensation of performing work, such that the user will more readily perceive deflection of the pad. This resistive element may be an electronic component incorporated into the core electronic module or may be a mechanical element incorporated into the housing. An example of the latter type of embodiment is a neoprene gasket positioned between the base and pad in the base/pad gap. As the pad is deflected, the base/pad gap will decrease in the direction of deflection of the pad, compressing the neoprene. The user will feel this compression as a resistance. Thus, a resistance/deflection linkage may be designed into the device. Furthermore, the device may include a restoring force, such that the pad will tend to return to the starting position or position of no deflection. An example of a restoring force or restoring force member or means is the neoprene gasket used to impart resistance when deflected; advantageously, it will also impart a restoring force after the deflecting force applied by a user's whole hand movement is removed or released.

In the neutral position, a "dead zone" may be created such that very small deflections do not move the cursor. This would allow the user to rest the hand on the device without disturbing operation. This "dead zone" would correlate with a solid cone of perhaps 0–3 degrees of deflection from the neutral position. This would be controlled via software or firmware in the controlling circuitry. For example, in situations where the moment arm is not perpendicular to the gravitational field and may be outside of the normal "dead zone" when resting, the user can activate all the selector switches simultaneously to instruct the computer that the moment arm is in the neutral zone and thus create a new "dead zone."

An actuator disc may made of a compressive material such as, for example, silicone with a durometer reading of 55 Shore A that would compress a resistor sheet, such as those available from InControl Solutions, Portland, Oreg. This actuator disc would provide both resisting and restoring forces, and would be connected to a shaft or similar construct that in turn would be connected to the large pad that the user's hand would contact. The shaft connects the pad to the actuating mechanism, i.e., piezoelectric module, resistor array, flex sensor, or actuator disc, or similar mechanism in the core electronics module, and is used to transmit off-axis movements of the user's palm or whole hand into deflections of the actuating mechanism, which in turn becomes motion of the cursor on screen.

The alignment of the pad and base is important as rotation of the moment arm changes the orientation of the core electronic translator module. In these cases, the rotation of the pad with respect to the base is limited by the incorporation of aligners, such as complementary grooves 70 with inserts 72 in the pad and base. These aligners prevent the rotation of the pad with respect to the base. Alternatively or additionally, the pad can be a non-circular design, such that when fitted into the base, it cannot be rotated freely.

The base is fitted with at least one input button 32. The button(s) is used to select an object or location on the screen. More than one button can be provided in the base in order to perform other functions, such as call up a menu, launch a predetermined program, or drag selected icons or other objects on screen to other locations on screen. Alternately or additionally, multiple switches can be incorporated into the device in order to provide single click selection. In this embodiment, double-clicking to perform selection is eliminated by using two or more switches as selectors. This quality can be advantageous for persons with special needs, such as the elderly and/or children, who cannot double-click with sufficient rapidity to cause selection. These buttons may be side-mounted on the base, such that they are accessible when the device is resting on a surface, and are activated by the user's digits.

Figure 2:
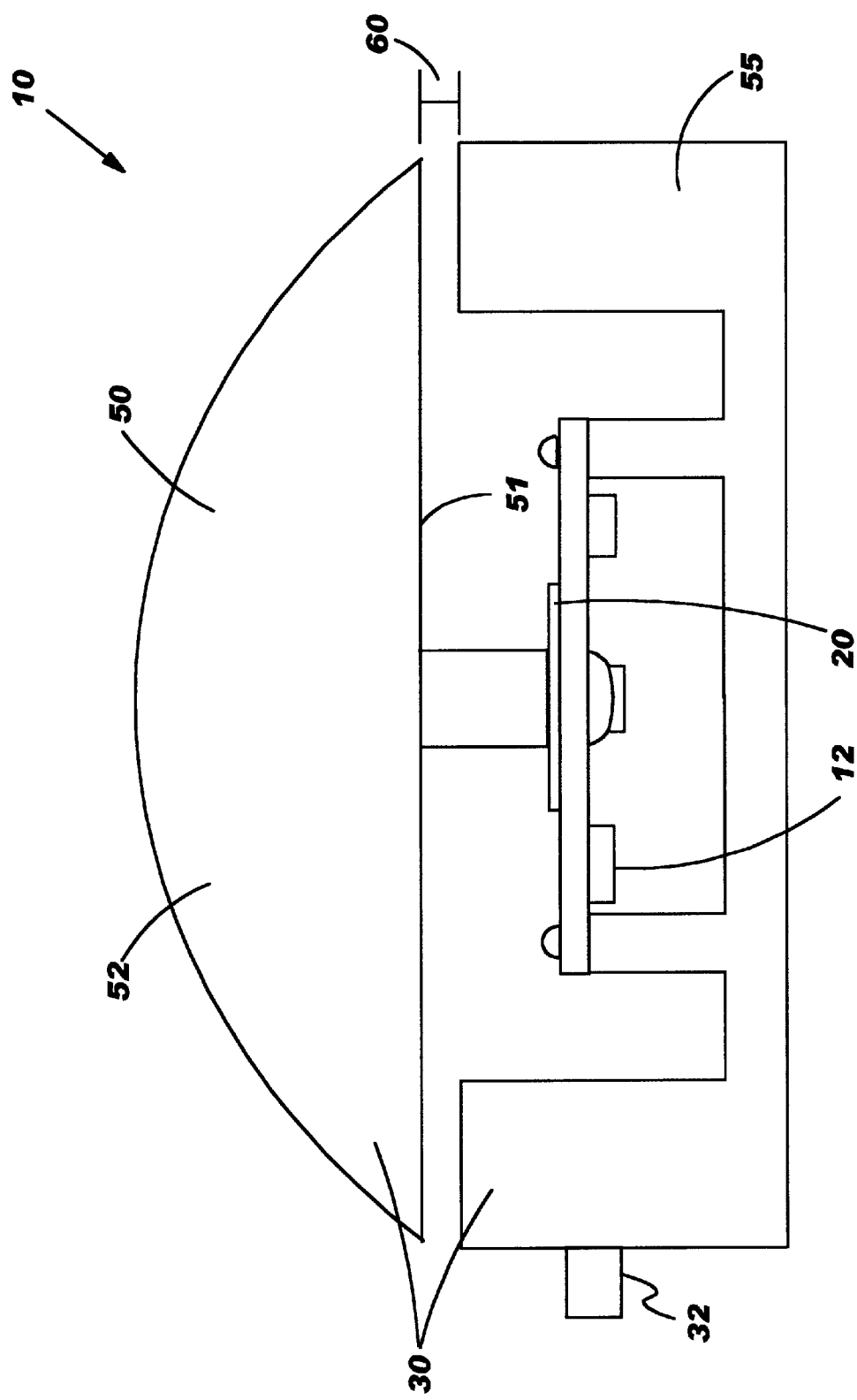
FIG. 2 is a cross-sectional assembled view of the embodiment of the present invention shown in FIG. 1.
Figure 3:
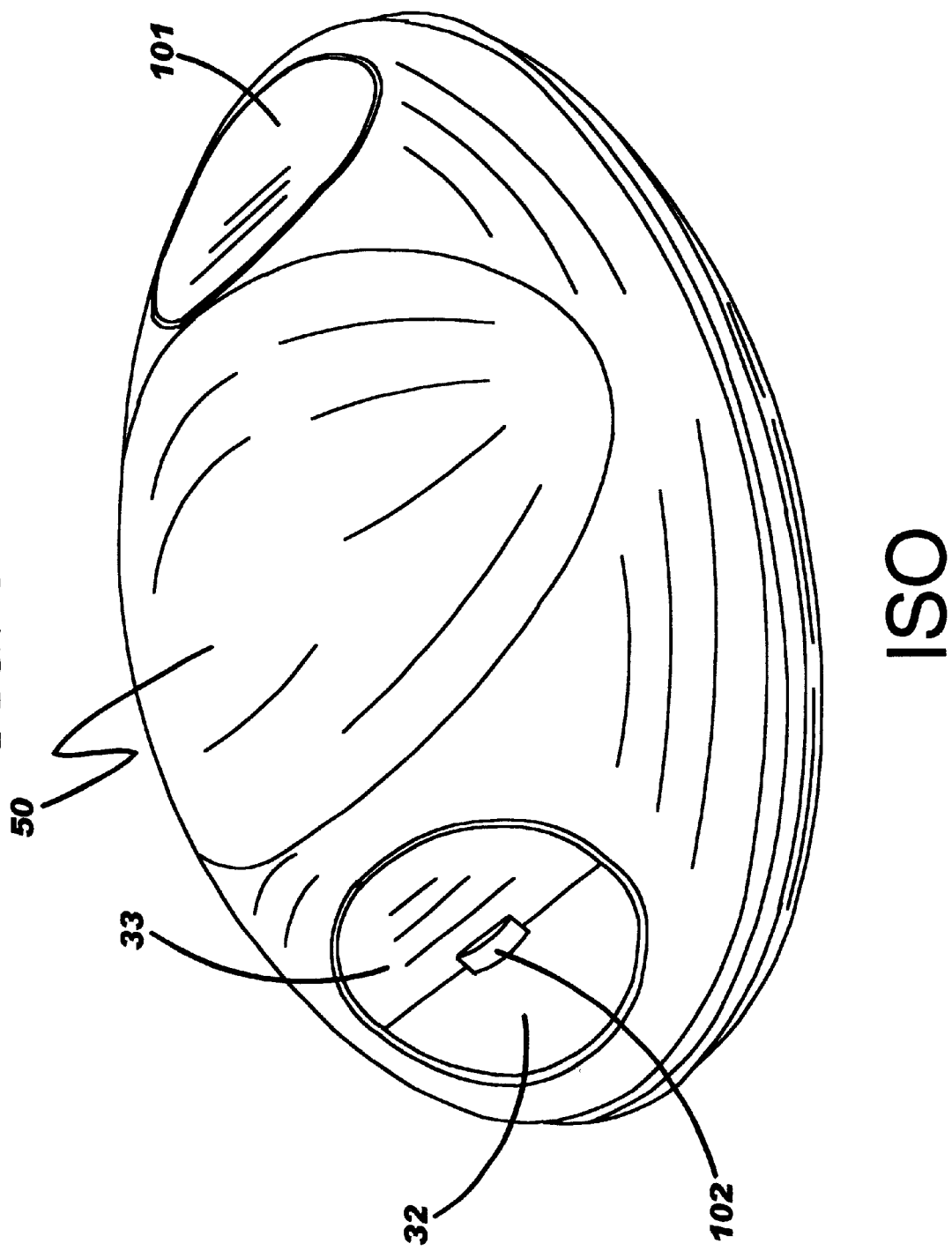
FIG. 3 is a perspective view of another alternative embodiment of the present invention.

Because the switches are side-mounted, they can be activated by the user with his/her thumb. More specifically, when the user grasps the device appropriately, the user can select and release an input button by adducting and/or flexing the thumb with the opponens pollicis, adductor pollicis obliquus, and/or adductor pollicis transversus muscles and abducting and/or extending the thumb with the abductor pollicis the extensor longus pollicis, the extensor brevis pollicis and/or extensor ossis metacarpi pollicis muscles. The adduction of the thumb is opposed by the opponens quinti digit muscle, which draws forward the fifth, or little finger. This motion, thumb oppositional movement, utilizes muscles that do not run through the carpal tunnel, as the digital flexors do, and thus reduces the use of the digital flexor muscles, whose overuse is associated with carpal tunnel syndrome. As shown in FIGS. 1 and 2, the cylindrical design encourages thumb oppositional movement. However, thumb oppositional movement can be favored by including a depression in the housing base opposite the switches. As shown in FIG. 3, an oppositional depression or groove 101 is incorporated into the base on the side opposite the selector switches 32 and 33. The user inserts his/her fifth or little finger into this oppositional depression, thus providing additional support for the fifth digit and promoting the thumb oppositional movement for the activation of selector switches. Additionally, the input switches 32 and 33 can be elongated such that the proximal phalanx and metacarpus of the thumb are preferentially used to activate a switch, whereas the distal phalanx is not. Flexing the distal phalanx utilizes the flexor longus pollicis, which runs through the carpal tunnel. Preventing the use of this muscle helps prevent carpal tunnel repetitive stress disorder. As shown in a preferred embodiment of the present invention in FIG. 4, the selector switches are elongated, such that the proximal phalanx and metacarpus of the thumb contact the elongated switches 32 and 33, incorporated into the base, and thus the user uses the proximal phalanx and metacarpus of his/her thumb to activate a selector switch. Thus, the user is induced by the elongated switch to activate a selector switch using thumb oppositional movement. Therefore, the elongated switch and oppositional depression induce the user to use thumb oppositional movement to activate the selector switches. Yet another characteristic of the present invention is the positioning of multiple switches 32 and 33 in vertical alignment, as shown in FIG. 5, such that the thumb moves up and down between the switches. This movement utilizes the thumb extensors, the extensor longus pollicis, extensor brevis pollicis, and extensor ossis metacarpi pollicis, to raise the thumb from the lower selection position to the upper selector position. Dropping the thumb to a lower button is accomplished by gravity. Thus, positioning the thumb over a selection switch is accomplished by three extensor muscles, and no flexor muscles, thus further reducing movement through the carpal tunnel.

The independence of the moment arm from base movement prevents the accidental movement of the cursor by jarring of the base during activation of a switch on the base. Thus, the device has an anti-jarring design that permits persons with difficulties in performing selections without moving the housing to use the device without this inconvenience.

The aforementioned design characteristics allow the tracking movement of the device to be effected by small whole hand movements, rather than by large displacements of the wrist, arm, and shoulder. The moment arm requires only small displacements to effect cursor movement. These displacements can be performed with the muscles of the upper arm and shoulder, thus alleviating use of the wrist and finger muscles. Moreover, the primary selector switch can be activated with the thumb using the thumb and fifth digit oppositional muscles, as opposed to using the digital flexor muscles. Therefore, selection can be predominantly effected by thumb oppositional movement without substantial digital flexure movements. Use of the thumb oppositional muscles reduces movement through the carpal tunnel. These features can help prevent repetitive stress injuries (RSI), especially carpal tunnel syndrome, in frequent users of these devices.

The device may connect to the computer or any other device that utilizes a cursor to select and manipulate objects, be they 2-D, 3-D, virtual, or physical, via a standard mouse port, such as a PS/2 type connector, via a wireless connection, via a USB connector, or via any other type of data transmission connection. The wireless connection can be via a wireless connection operating over a variety of radio frequency protocols, including, but not limited to, IEEE 802.11 or Bluetooth, or via an optical connection, such as an infrared light connection.

The device can include a serial port connection 90 incorporated into the housing, such that other devices can be plugged into the device or even incorporated into the base of the device. By way of example, and not of limitation, digital cameras and digital recorders can be connect to the device for transfer of files and other data to and from the computer. The base may include one or more USB ports or ports for other protocols, such as Ethernet, IEEE 802.11, Bluetooth, and the like, and act as a hub for multiple connections. In addition, magnetic stripe readers, memory stick readers, credit card readers, and the like can be incorporated into the base or connected to it. Moreover, additional computers besides the primary computer can be hooked to the computer pointing device. In this embodiment, the user can switch between computers with a toggle switch or similar incorporated into the housing. The device may also incorporate additional functions, such as scrolling wheels for easier page navigation, into the base housing.

One design embodiment includes a circular-shaped housing. This design allows for easy scalability to fit various users' hand size. The housing can also be formed with translucent materials that allow the user to see the interior of the device. This translucence may be desirable in order to determine if any of the components in the interior of the device are broken or otherwise malfunctioning. Additionally, a light source (not shown), such as an LED, can be incorporated into the interior of a device thus made to allow the user to more easily locate the device under poor lighting conditions.

In a preferred embodiment shown in FIGS. 3, 4, 5, 6 and 7, the pointing device is symmetrical about the lateral axis XX, such that it can be rotated 180 degrees about the vertical axis YY and be used by the alternate hand, that is, the device is an ambidextrous pointing device. This enhanced functionality is made possible because the switches are side-mounted, vertically aligned, and symmetrical about a vertical axis, such that they can be activated by the user with his/her thumb. Side-mounting the selector switches allows them to be vertically aligned. Vertical-aligned switches are in the same relative orientation regardless of the rotation of the device about the vertical axis. Therefore, the switches remain in the same relative orientation to the hand and thumb when the device is rotated for use with the alternate hand. Making the switches symmetrical about their vertical axis ensures there is no difference in feel or perception between orientations when the device is used in the left- and right-handed orientation. The positioning of multiple switches in vertical alignment such that the thumb moves up and down between the switches utilizes the thumb extensors, the extensor longus pollicis, extensor brevis pollicis, and/or extensor ossis metacarpi pollicis to raise the thumb from the lower selection position to the upper selector position. Dropping the thumb to a lower button is accomplished by gravity. Thus, positioning the thumb over a selection switch is accomplished by three extensor muscles, and no flexor muscles, thus further reducing movement through the carpal tunnel.

Figure 4:
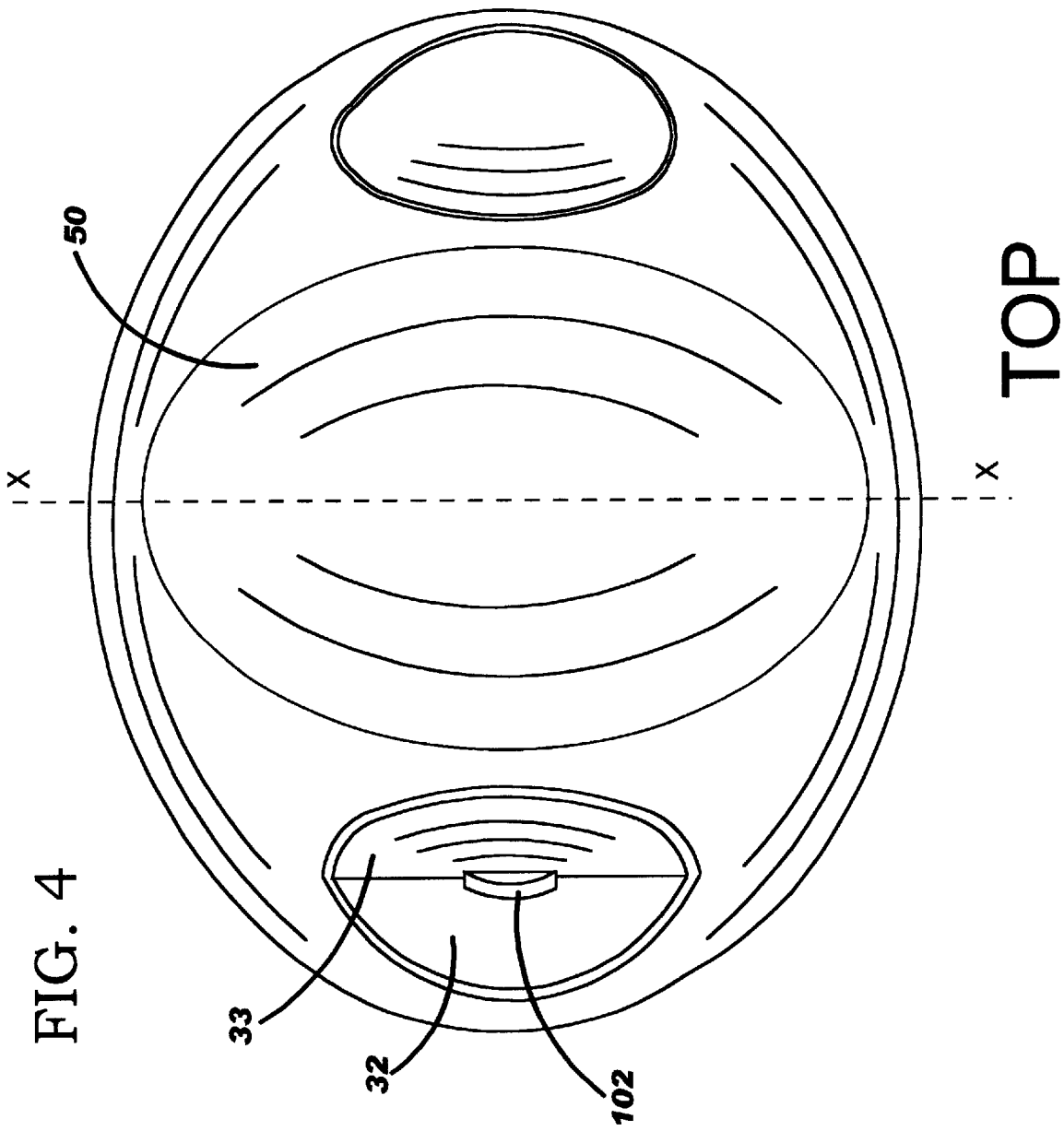
FIG. 4 is a top view of FIG. 3.
Figure 5:
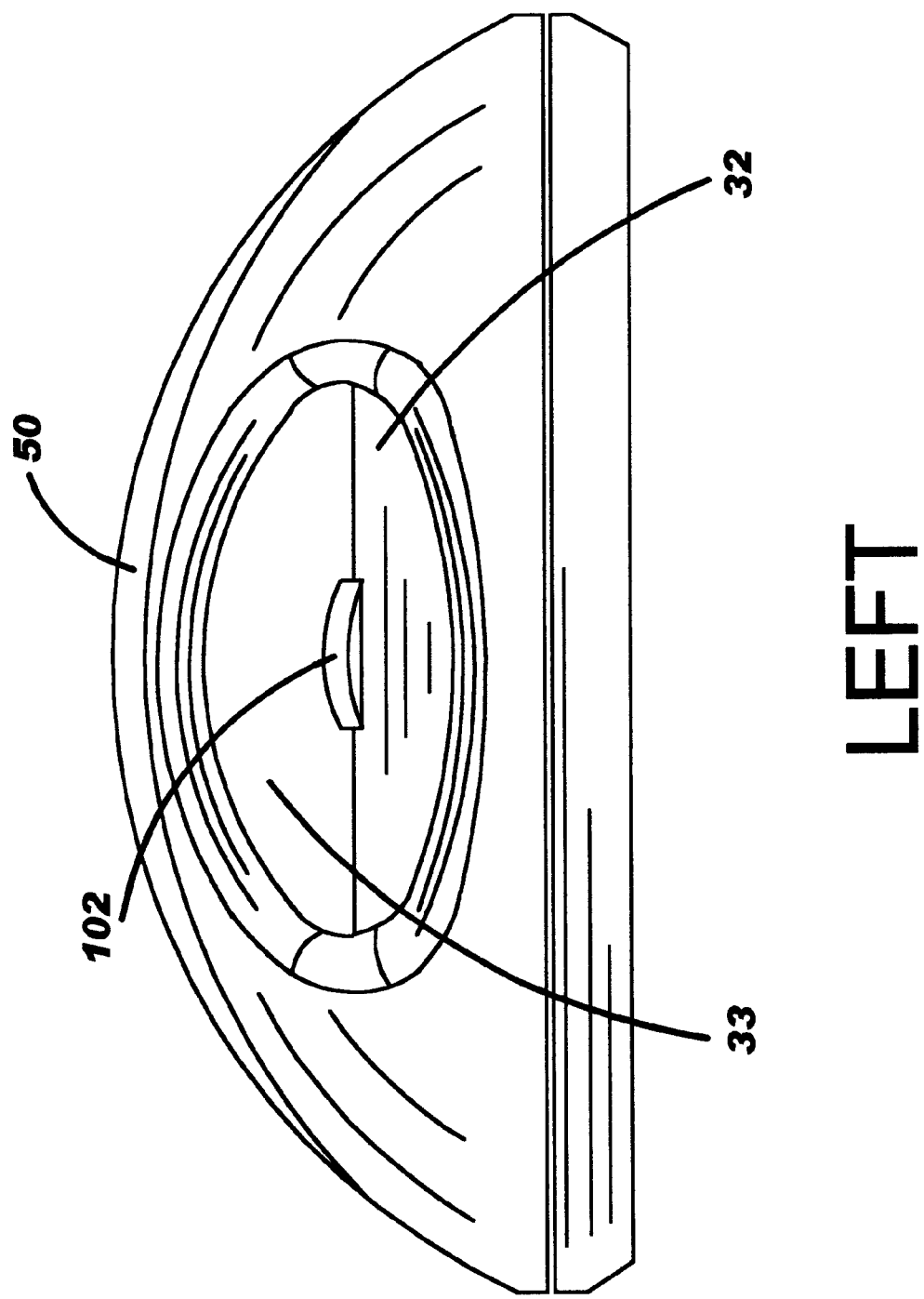
FIG. 5 is a left end view of FIG. 3.
Figure 6:
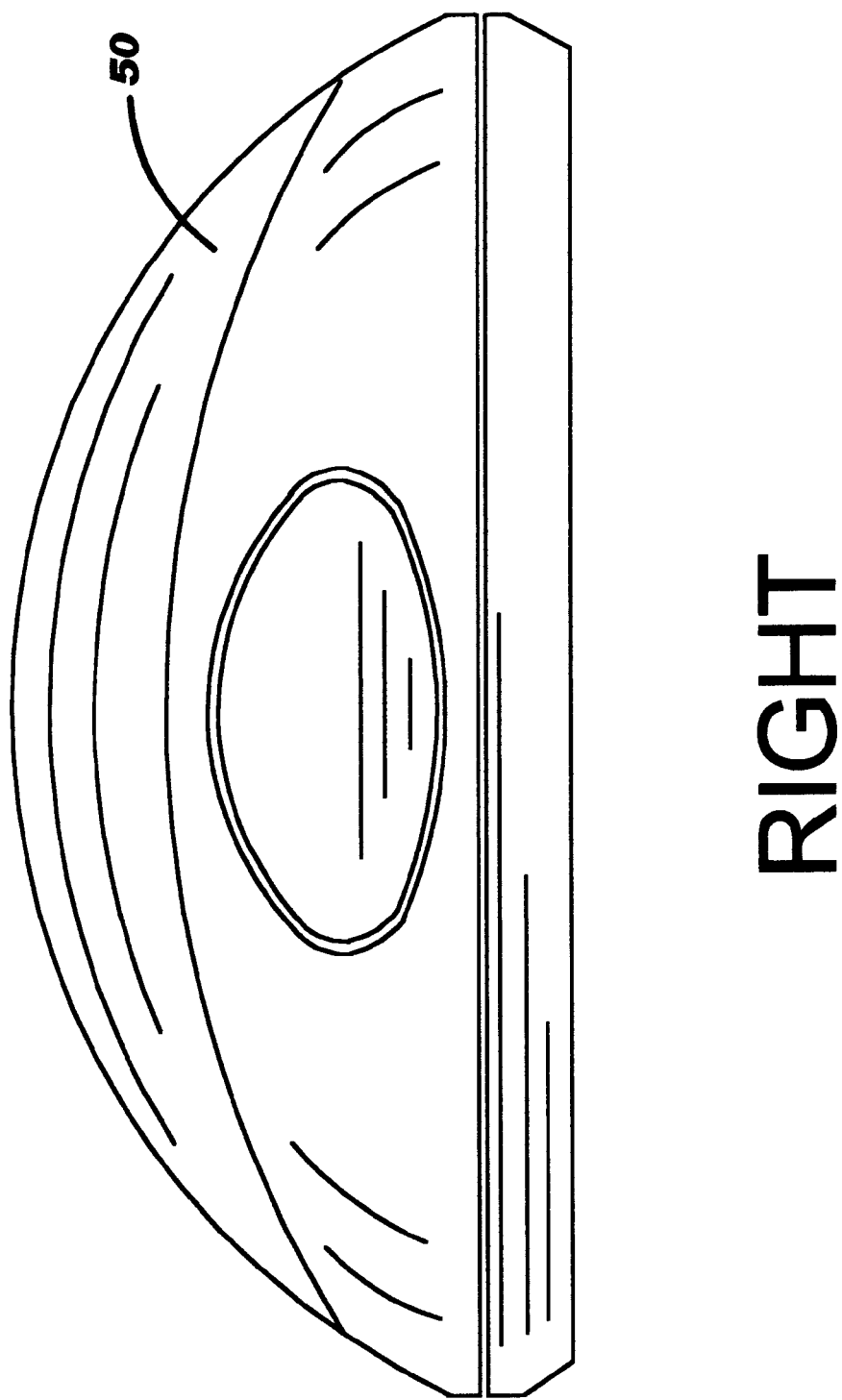
FIG. 6 is a right end view of FIG. 3.

Side and vertical alignment of switches 32 and 33, as shown in FIGS. 3, 4, and 5, allows the user to effect selection using thumb oppositional movement. When the user grasps the device appropriately, the user can select and release an input button by adducting and/or flexing the thumb with the opponens pollicis, adductor pollicis obliquus, and/or adductor pollicis transversus muscles and abducting and/or extending the thumb with the abductor pollicis, the extensor longus pollicis and/or the extensor brevis pollicis muscle. The movement of opposition is predominantly preformed by the opponens pollicis, which flexes or draws the metacarpal bone inward over the palm, and at the same time rotates the bone, so as to turn the ball of the thumb toward the fingers, thus producing the movement of opposition. However, the other thumb adductor and flexor muscles can contribute to the motion of switch selection. The oppositional movement of the thumb is opposed by the opponens quinti digit muscle, which draws forward the fifth, or little finger, deepening the hollow of the palm. This oppositional movement cups the users' palm around the device in a natural action that raises it slightly off the pad, further reducing the risk of cursor jarring. Because the user may need to access both a selector switch and the pad simultaneously, for example when dragging and dropping an object, the lower switch is preferably the switch for this function. In this configuration, the user's palm is closer to the pad when selecting the lower switch, and therefore the user does not have to flex the metacarpus of the hand as severely to contact the pad as if the upper switch were used for this function. Conversely, making the upper switch function as the primary selector switch that activates an executable function raises the palm higher off the pad when performing this action and reduces the chances of jarring the pad at that time.

Thumb oppositional movement utilizes the larger, more robust thumb muscles rather than smaller finger muscles. Moreover, the thumb oppositional movement does not utilize muscles, such as the digital flexors, that run through the carpal tunnel. Rather, these muscles are located external to the carpal tunnel, and thus reduce movement of muscles and tendons through the carpal tunnel, a movement whose overuse is associated with carpal tunnel syndrome. This thumb oppositional movement can be favored by including a depression in the housing base opposite the switches. As shown in FIG. 3, an oppositional depression or groove 101 is incorporated into the base on the side opposite the selector switches. The user inserts his/her fifth or little finger into this oppositional depression, thus providing additional support for the fifth digit and promoting the thumb oppositional movement as describe above for the activation of selector switches. Additionally, the input switches can be recessed such that the distal phalanx of the thumb cannot be flexed to activate a switch. Flexing the distal phalanx utilizes the flexor longus pollicis, which runs through the carpal tunnel. Preventing the use of this muscle helps prevent carpal tunnel repetitive stress disorder. As shown in a preferred embodiment of the present invention in FIG. 5, the selector switches 32 and 33 are elongated to approximately 45 degrees of arc, such that the majority of the user's thumb contacts the switch. Such a design allows the user to use the proximal phalanx and metacarpus of the thumb in thumb oppositional movement to activate the switch, rather than the distal phalanx of the thumb. Thus, the user is induced by the elongated switch design to activate a selector switch using thumb oppositional movement. Therefore, the elongated switch design and oppositional depression induce the user to use thumb oppositional movement to activate the selector switches. Also shown in FIGS. 3, 4, and 5, a scrolling device 102 is included between the selector switches for increased functionality. The scroll device permits scrolling through documents without having to position the cursor over a particular area or button. As such, the scroll device reduces the thumb and pad movements required to perform scrolling. The scrolling device can be a scroll wheel, rocker switch, and the like.

As shown in a preferred embodiment in FIGS. 3, 4, 5, 6, and 7, the pad 50 is an oval pad rather than a rectangular pad. This shape is preferred because an oval pad is perceived by the user as being capable of moving in 360 degrees, whereas a rectangular pad is often perceived as moving only forward and backwards.

Several benefits are associated with the present invention. The use of axis-deflection technology eliminates problems associated with many pointers that use position-to-position mapping, including clutching, repetitive stress injuries of the shoulder and wrist due to large movements of the pointer, repetitive stress injuries of the carpal tunnel due to increased use of digital flexor muscles, jarring of the cursor when selecting, increased surface area requirements, fouling, humidity-sensitivity, and enclosed projectiles.

"Clutching" is an interaction property inherent in tablets, mice, and other devices using relative positioning. Clutching is the process of disengaging, adjusting, and re-engaging the input device to extend its field of control. This is necessary when the tracking symbol, whether a cursor on a planar CRT or a virtual hand in 3-space, cannot move because the controlling device has reached a limit in its physical space. The most obvious example is lifting and repositioning a mouse when it reaches the edge of the mouse-pad; however, many input devices for virtual environments require constant clutching to allow the user to attain new vantages in a potentially huge task space. In such situations, clutching is implemented through a supplemental switch or through gestural techniques such as grasping. Characteristics such as this affect performance, but quantitative distinctions are difficult to measure because they are highly task dependent. Because the device uses force-to-velocity mapping, or deflection, rather than position-to-position mapping, or translation, as the input, the device does not need to be clutched to achieve total range of cursor motion, as is necessary for touch pads, mice, and trackballs. Moreover, this property allows the tracking device to be incorporated directly into the computer, as translation of the device is not necessary. This can be especially important in areas and applications with space constraints, such as server farms.

The configuration of the present invention allows for use in areas where current technology is inappropriate or inadequate. For example, because the device allows for gravity-independent operation and does not need to contact a surface, the device can be use in a variety of positions with respect to the gravitational field, including laterally, upside-down, in micro-gravity situations, and in neutral or positive buoyancy situations. In such situations, for example, the user can activate all the selector switches simultaneously to instruct the computer that the moment arm is in the neutral zone and thus create a new dead zone. Also, the device is non-fouling and insensitive to humidity because the device will not accrete debris, as a ball-based device would, nor is the device sensitive to humidity, as touch pads are.

Children frequently disassemble objects out of curiosity, vandalism, etc. Devices with removable balls are frequently disassembled and the ball used as a projectile by the child. For this reason, many schools require that the ball be permanently retained in the device, thus eliminating the potential danger, but simultaneous preventing cleaning of the internal components of the device.

Applications for the present invention, in addition to normal use, include dirty and/or humid environments such as near machinery and medical ultrasound equipment; "clumsy environments" such as underwater or in microgravity environments; and in situations where the user does not have adequate dexterity to use the other available pointing devices. Additional configurations of the present invention also include use as a foot pedal and use with a wrist rest ring. Also, a finger insertion ring can be incorporated into the top of the pad, such that a person can slip at least one finger through the ring to stabilize the hand and aid lateral motion. Persons suffering from neuromuscular disorders, such as multiple sclerosis or Parkinson's, may find this advantageous.

Certain modifications and improvements will occur to those skilled in the art upon a reading of the foregoing description. All modifications and improvements have been deleted herein for the sake of conciseness and readability but are properly within the scope of the following claims.

I claim:

1. A method for providing electronic tracking and selecting comprising the steps of:

providing a computer pointing device for electronic tracking and selecting comprising:
a core electronic translator module; and
a housing having a core electronic translator module extension that forms a top surface of the housing, a base, and a core electronic translator module extension/base gap separating the core electronic translator module extension and the base, which are connected therebetween by an axis extension of the core electronic translator module axis, and a deflection-resisting element in the core electronic translator module extension/base gap, the base including at least one input switch on a side of the housing and at least one data transmission connection for communicating with a computer, wherein the tracking movement of the device is effected by whole hand movement caused by pressure from substantially all of the palm of the hand applied to the top surface of the housing via the housing core electronic translator module extension and wherein selection is predominantly effected by thumb oppositional movement on the input switch which is capable of being activated without moving the whole hand from its position on the top surface of the housing and substantially no digital flexure movements;

activating the tracking function of the device by a user imparting whole hand movement by applying pressure from the palm to the housing top surface onto the housing core electronic translator module extension for producing deflection thereof with respect to the base and the core electronic translator module axis; and activating the selecting function of the device by a user imparting thumb oppositional movement to the input switch without moving the whole hand from its position on the top surface of the housing.

2. A computer pointing device for electronic tracking and selecting comprising:

a core electronic translator module; and a housing having a core electronic translator module extension that forms a top surface of the housing, a base, and a core electronic translator module extension/base gap separating the core electronic translator module extension and the base, which are connected therebetween by an axis extension of the core electronic translator module axis, and a deflection-resisting element in the core electronic translator module extension/base gap, the base including at least one input switch on a side of the housing and at least one data transmission connection for communicating with a computer, wherein the tracking movement of the device is effected by whole hand movement caused by pressure from substantially all of the palm of the hand applied to the ton surface of the housing via the housing core electronic translator module extension and wherein selection is predominantly effected by thumb oppositional movement on the input switch which is capable of being activated without moving the whole hand from its position on the ton surface of the housing and substantially no digital flexure movements.

3. A computer pointing device for electronic tracking and selecting comprising:

a core electronic translator module and a housing having a core electronic translator module extension that forms a top surface of the housing, a base, and a core electronic translator module extension/base gap separating the core electronic translator module extension and the base, which are connected therebetween, the base including at least one input switch on a side of the housing and at least one data transmission connection for communicating with a computer, wherein the tracking movement of the device is effected by whole hand movement applied to the top surface of the housing formed by the housing core electronic translator module extension.

4. The device according to claim 3, wherein the core electronic translator module further includes an axis-deflection-based translator module.

5. The device according to claim 4, wherein the axis-deflection-based translator module further includes a variable resistor-based translator module.

6. The device according to claim 5, wherein the variable resistor-based translator module is selected from the group consisting of piezoelectric module, resistor array, actuator disc, flex sensor.

7. The device according to claim 3, wherein the core electronic module uses force-to-velocity mapping.

8. The device according to claim 3, wherein the core electronic module uses time-to-motion mapping.

9. The device according to claim 3, wherein the housing further includes an axis extension of the core electronic translating module axis.

10. The device according to claim 9, wherein the terminus of the axis extension is capable of being deflected from the axis.

11. The device according to claim 10, wherein the deflected terminus forms a hemispherical pad.

12. The device according to claim 11, further including a hemispherical pad of low relief.

13. The device according to claim 12, further including a finger insertion ring in the hemispherical pad of low relief.

14. The device according to claim 9, wherein the axis extension includes a message space.

15. The device according to claim 14, wherein the message space is customizable.

16. The device according to claim 9, wherein the axis extension is removable via one-step extraction.

17. The device according to claim 3, wherein the base is fixed.

18. The device according to claim 3, wherein the base is moveable.

19. The device according to claim 3, wherein the base and the axis extension are maintained in rotational alignment by aligners.

20. The device according to claim 3, wherein the core electronic translator module extension/base gap limits axis deflection to a predetermined distance.

21. The device according to claim 3, further including a deflection-resisting element in the core electronic translator module extension/base gap.

22. The device according to claim 21, wherein the deflection-resisting element provides variable resistance linked to the degree of deflection, thereby providing increased feedback to the user.

23. The device according to claim 21, further including a restoring force for restoring the core electronic translator module extension to a pre-deflected position.

24. The device according to claim 23, herein the restoring force is a neoprene gasket.

25. The device according to claim 23, wherein the restoring force is an actuator disc.

26. The device according to claim 23, wherein the restoring force is provided by the axis.

27. The device according to claim 3, wherein there are more than one input switches that are side-mounted on the housing.

28. The device according to claim 3, including a thumb-activated input switch.

29. The device according to claim 3, wherein the input switch is activated predominantly by thumb oppositional movement.

30. The device according to claim 3, wherein the at least one data transmission connection is selected from the group consisting of PS/2, wireless, USB, and serial port.

31. The device according to claim 3, further including an optical wireless correction for communicating with the computer.

32. The device according to claim 3, wherein the at least one data transmission connection is removably connectable to devices other than the primary computer.

33. The device according to claim 32, wherein the other devices are selected from the group consisting of digital cameras, digital recorders, magnetic stripe readers, memory stick readers, secondary computers, and combinations thereof.

34. The device according to claim 3, wherein the housing is scalable.

35. The device according to claim 3, wherein at least part of the housing is made of translucent materials.

36. The device according to claim 35, the housing further includes an interior light.

37. The device according to claim 3, wherein selection is predominantly effected by thumb oppositional movement on the input switch without moving the whole hand from its position on the top surface of the housing.

38. The device according to claim 3, wherein selection requires thumb oppositional movement, such movement being capable of occurring without moving the whole hand from its position on the top surface of the housing.

39. The device according to claim 3, wherein selection is effected with substantially no digital flexure movements.

* * * * *